Jan. 19, 1937.  V. N. HYBINETTE  2,068,329
GRID FOR ICE TRAYS
Filed June 19, 1933  2 Sheets-Sheet 1

Inventor
Victor N. Hybinette
by Townsend & Beaman
Attorney

Jan. 19, 1937.  V. N. HYBINETTE  2,068,329
GRID FOR ICE TRAYS
Filed June 19, 1933  2 Sheets-Sheet 2

Inventor
Victor N. Hybinette
by Townsend F. Beaman
Attorney

Patented Jan. 19, 1937

2,068,329

UNITED STATES PATENT OFFICE 2,068,329

GRID FOR ICE TRAYS

Victor N. Hybinette, Jackson, Mich., assignor to The Nicralumin Company, Jackson, Mich., a corporation of Michigan Application June 19, 1933, Serial No. 676,516

16 Claims. (Cl. 62—108.5)

The present invention relates to improvements in grid construction for ice trays and similar containers.

It is universal practice at the present time to provide an evaporating chamber in domestic refrigerators for receiving trays in which water, foods and desserts are chilled or frozen. In the freezing of water, and the like, it is considered convenient that the frozen material takes the form of small units of regular geometric shape which may be readily inserted in glasses, pitchers, and the like. To this end such trays have been heretofore equipped with grids of fixed configuration which are insertable into the trays to divide the same into various compartments. For the most part, grids of this character have proven to be exceedingly objectionable because of the difficulty experienced in the removal of the frozen units from the tray and grid. Heretofore the removal of the units from the trays has necessitated the subjection of the tray and grid to an increase in temperature in order to thaw the frozen units and grid from the tray and from one another. The usual practice has been to pass a stream of water over the tray or its content to effect the required thawing action. Obviously, such a procedure is both ersome and exceedingly uneconomical. Thus it becomes the object of this invention to provide a grid construction capable of greatly facilitating the removal of ice cubes and the like therefrom as compared with standard practice.

My improved grid is capable of being employed in the usual ice tray and consists of sectional strips of suitable material, preferably sheet metal, which, in a closely assembled and confined state within the tray, is of such configuration as to define a plurality of compartments of suitable geometric shape. These sectional strips are freely grouped in a readily distortable state, outside of the tray, by hinge arrangements permitting the sections of the grid to be spread or opened with little effort. For example, the arrangement may take the form of a separate part upon which the sectional strips are loosely threaded or pivoted about, or the strips may be attached, integrally or otherwise, at spaced points providing free ends with the flexibility of the strips being depended upon to provide the necessary hinging or spreading action. As will be obvious from the description to follow, innumerable other arrangements of the grid sections may be resorted to without departing from the scope of the invention.

In combination with my improved grid, I have shown convenient and effective means for breaking the grid sections free from the tray and I consider this an important part of the present invention.

Additional objects and advantages residing in the arrangement and combination of parts will be more fully treated in the detailed description. The invention is clearly defined in the appended claims.

Figure 1:
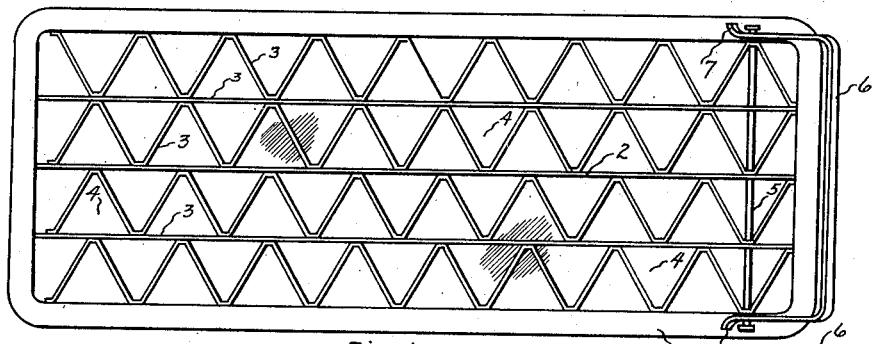
Fig. 1 is a plane view of an embodiment of the invention confined within a tray.
Figure 10:
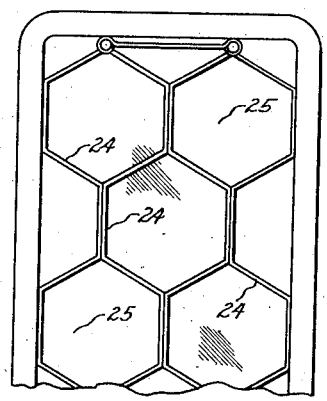
Figure 11:
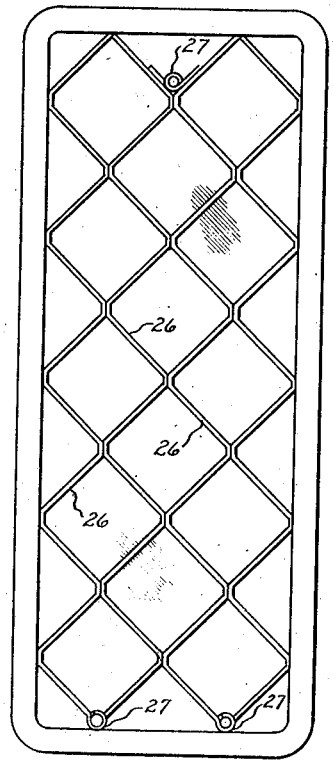
Figure 12:
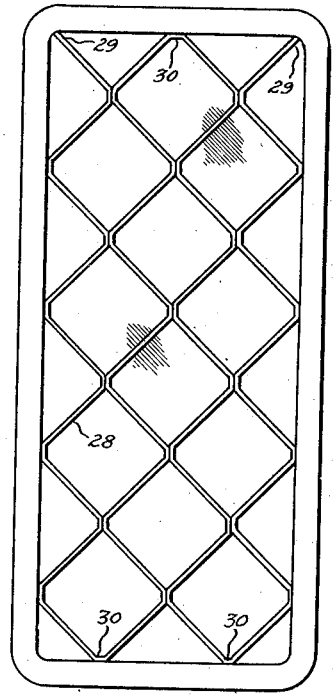

Figs. 10 to 12, inclusive, are views similar to Fig. 1 of still further modified embodiments of the invention.

Generally, my improved grid consists in relatively thin strips, preferably of non-corroding sheet metal, loosely supported along a longitudinal edge upon the bottom of the tray. These strips when confined within the tray are correctly positioned relative to each other and define compartments of any desired shape or form. When removed from the confining walls of the tray, the assemblage of the several strip sections is such that there is but slight tendency for the strips to retain the relative position assumed within the tray with the result that the grid may be readily opened or spread to release the individual ice pieces frozen therein. In several of the embodiments shown, the strips constituting the grid extend longitudinally of the tray and are loosely bundled at one end for retaining the same in an assembled state. Other embodiments illustrate the employment of hinge members located at the end between contiguous strips to permit expanding of the grid removed from the tray. In one of the modifications, the grid sections are shown as being integrally attached at the ends of the tray to form a grid of longitudinal and transverse serpentine configuration in which the flexibility of the material is depended upon for the expansion of the grid for releasing the ice pieces.

Figure 2:
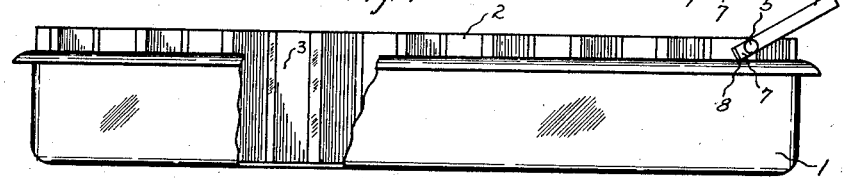
Fig. 2 is a side elevation of Fig. 1 with a portion of the tray broken away.

Having specific reference to the drawings, in Figs. 1 and 2, a coagulating or freezing tray 1 of suitable construction is shown provided with a removable matrix or grid 2 embodying the principles of the invention. As illustrated, the grid 2 consists of relatively thin vertically disposed strips 3, preferably of non-corroding metal, supported along the lower longitudinal edges upon the bottom of the tray 1. The strips 3 when positioned within the tray are contiguous with each other and may be of any suitable configuration to define compartments 4 within the tray. As shown the strips 3 are in the form of alternating rows of straight and reversely bent sections defining prismatic compartments. With this construction, the straight strips assist in the correct positioning of the reversely bent strips and permit the coagulated pieces to be readily removed from the compartments 4. Each strip 3 of the grid 2 is freely disposed throughout the greater portion of its extent with reference to an adjacent strip with the relative position of each strip being primarily dependent upon the positioning by the side walls and bottom of the tray. Although, I consider the employment of my improved grid forming strips within the tray without any interconnections between the same and being independently removable therefrom within the scope of the present invention, I prefer to employ interconnections between the various strips to permit the removal and insertion of the same as a unit. To this end, a rod 5 is loosely threaded through upper portions of the strips projecting above the tray 1. A handle 6 is secured to the ends of the rod 5 and has portions 7 extending beyond the axis of the rod. In the removal of the grid 2 from the tray, an upward movement of the handle 6 to the position shown in Fig. 2 will result in fulcruming the portions 7 about points 8 upon the tray to effect adequate mechanical advantage to readily break the adhesion between the contents of the grid and the tray resulting from freezing, for example. The grid 2 may now be removed from the tray as a unit by the handle 6. As the strips are freely disposed with reference to each other except for the loose interconnections effected by the rod 5, relative movement between the respective strips 3 is readily accomplished to effect an expanding or spreading action of the loosely assembled grid to release any substance coagulated within the compartments 4. Obvious ways of effecting a mechanical advantage through the handle portion or its equivalent for breaking the adhesion between the contents of the grid and tray will readily suggest themselves to those skilled in the art in view of the foregoing disclosure.

Figure 3:
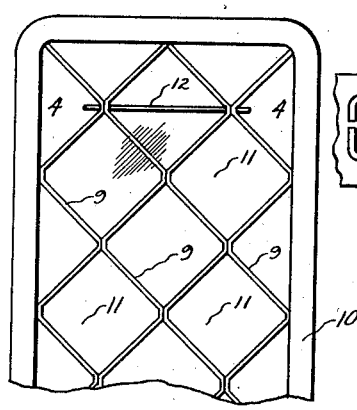
Fig. 3 is a fragmental plan view of a tray and a modified type of grid.
Figure 4:
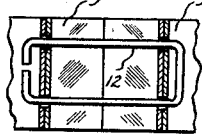
Fig. 4 is a cross sectional view taken on line 4—4 of Fig. 3 of the means for assembling the sections of the grid.

In the modification shown in Figs. 3 and 4, the longitudinal extending strips 9 constituting the grid are freely disposed throughout substantially the entire length of the tray 10 and are of a configuration collectively defining cubical compartments 11. The strips are likewise correctly positioned by the walls and bottom of the tray and are retained in an assembled yet distortable state by a rectangular bent wire 12 threaded through apertures in the various strips 9. As in the embodiment disclosed in Figs. 1 and 2, with the grid removed from the tray, the freely disposed strip sections may be spread or expanded relative to each other to release the cubes coagulated within the compartments 11.

Figure 5:
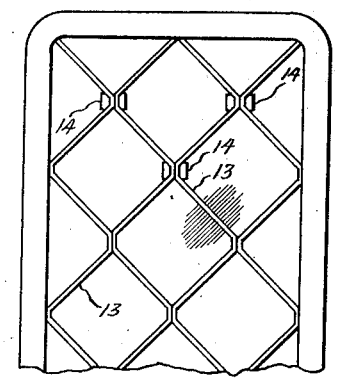
Figs. 5 and 6 are views similar to Fig. 3 of further embodiments of grid section assembly.

The grid disclosed in Fig. 5 may comprise strips 13 similar to the strips 9. For retaining the strip in an assembled yet readily distortable state, rivets 14 are passed through otherwise freely disposed adjacent strip sections. The rivets 14 may be of flexible material such as of rubber or the usual type of metal rivet may be employed and the flexibility of the material constituting the grid depended upon to permit the expanding or spreading action of the same.

Figure 6:
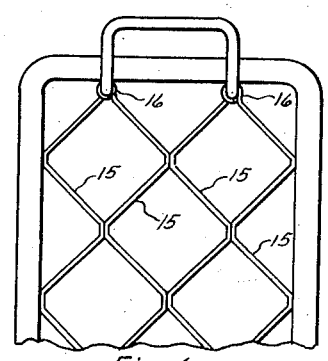
Figure 7:
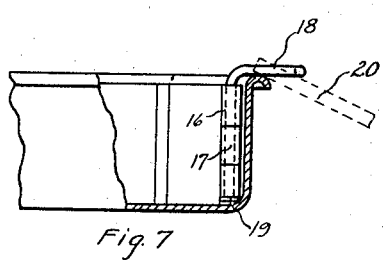
Fig. 7 is a fragmental side elevation of one end of the tray broken away to show the hinge arrangement.

In Figs. 6 and 7, the grid comprises freely disposed strips 15 hinged at 16 upon a continuous rod 17 extended between the hinged points to constitute a bent over handle portion 18; the ends of the rod are upset at 19 to provide head portions. With this arrangement a knife handle or similar implement 20 may be inserted as shown in Fig. 7 using the tray as a fulcrum for effecting a mechanical advantage through the handle 18 to readily break the grid from the tray. With the grid removed from the tray, the hinged strips may all be swung outwardly with respect to each other to release the coagulated cubes.

Figure 8:
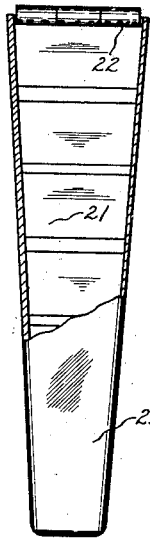
Figs. 8 and 9 are broken end and side elevational views, respectively, of my improved grid adapted to a tray of the deep can type.
Figure 9:
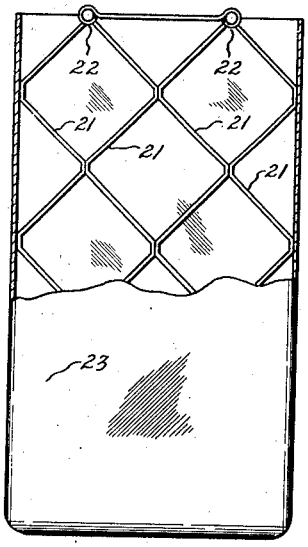

In the embodiment illustrated in Figs. 8 and 9, the grid consists of strips 21 freely disposed throughout their length and hinged at 22; being tapering downwardly to conform to the tapered deep can type of ice tray 23 disclosed in my copending application, Ser. No. 643,011, filed November 17, 1932.

As has been heretofore stated, the present invention is not limited to any particular grid compartment configuration. However, experiments have revealed that the formation of the hinged strips 24 as shown in Fig. 10 to collectively define compartments 25 having obtuse angles facilitates the removal of the ice pieces, for example, from the compartments upon expanding or spreading the strips.

In Figs. 11 and 12, the grid defining the compartments within the tray is composed of strips having hinging action at both ends imparting an accordion action to the expanding or spreading of the grid upon release of the substance coagulated within the compartments. As shown in Fig. 11, the strips 26 are hinged at opposite ends of the tray as at 27. In Fig. 12, the grid consists of an integral strip 28, preferably of springy metal, of longitudinal and transverse serpentine configuration with the free ends designated at 29. When the grid is removed from the tray and expanded in an accordion like manner, the elasticity of the metal will permit a hinge like action at the points 30 where the strip is reversely bent upon itself.

In the appended claims reference to "sections" of the grid is meant to be descriptive of portions of strip or strips constituting the grid located between spaced transverse planes irrespective of whether the grid is constructed from a plurality of longitudinal extending strips having free or hinged end portions, or from a single strip reversely bent upon itself as shown in Fig. 12, or otherwise.

Having described my invention, what I claim as new and desire to protect by Letters Patent is:

1. In combination, a container for substances to be coagulated having side walls and a bottom, a removable grid for defining a plurality of compartments within said container comprising adjacent sections coacting to define said compartments, said sections being contiguous yet freely disposed relative to each other along the greater portion of their associated extent, connecting means loosely bundling together said sections, said sections being held in position by the walls of said container and supported upon the bottom thereof, the sections of said grid being readily movable relative to each other upon removal from said container whereby the coagulated substance located within the compartments is released.

2. In combination, a container for substances to be coagulated, a removable grid for defining a plurality of compartments within said container comprising relatively movable disjoined strips contiguously arranged with respect to each other and defining said compartments, means for assembling said strips into a unit having connections therewith of a character enabling relative movement without distortion of said strips, the relative position of said strips being maintained by said container, the strips of said grid upon removal from the container loosely engaging the substance coagulated within the compartments defined thereby and being movable relative to each other to release the same.

3. In combination, a container for substances to be coagulated, a removable grid within said container comprising contiguous coextensive disjoined portions of a configuration defining compartments within said container in which the substance is coagulated, means for assembling said portions into a unit having connections therewith of a character enabling relative movement without distortion of said portions, said portions being retained in proper relative position by said container and being freely disposed relative to each other, said portions upon removal of the grid from the container loosely engaging the coagulated substance located in the compartments defined thereby, whereby removal of the substance from the grid is facilitated.

4. As an article of manufacture, a removable matrix for coagulating tray used in refrigerators comprising contiguous sections of relatively thin disjoined strips of a configuration collectively defining spaced compartments, said sections being freely disposed relative to each other, means for assembling said strips into a unit having connections therewith of a character enabling movement without distortion of said strips, whereby a substance coagulated within said compartments may be readily released upon removal of the matrix from the tray.

5. As an article of manufacture, a removable matrix for coagulating containers used in refrigerators comprising adjacent coextensive sections of relatively thin disjoined strip material collectively defining spaced compartments or cells, said sections being freely disposed relative to each other throughout their greater extent, and means for retaining said strips in an assembled yet distortable state as a unit without distortion of said sections severally.

6. In combination, an ice tray for refrigerators, a removable grid positioned within said tray comprising contiguous longitudinal extending disjoined strips vertically disposed and supported along one edge upon the bottom of said tray, said strips being freely associated with each other throughout at least the greater portion of their extent and being of a configuration defining compartments within said tray, said strips being held in relative position by the walls of said tray and being relatively movable upon removal from the tray to release the ice formed within the compartments, and means common to adjacent strips for retaining the same in an assembled yet distortable state, said means permitting relative movement between said adjacent strips without distortion of the individual strips.

7. In combination, an ice tray for refrigerators, a removable grid positioned within said tray comprising contiguous longitudinal extending strips vertically disposed and supported along one edge upon the bottom of said tray, said strips being unconnected with each other throughout at least the greater portion of their extent and being of a configuration defining compartments within said tray, said strips being held in relative position by the walls of said tray and being relatively movable upon removal from the tray to release the ice formed within the compartments, interconnections for retaining said strips in an assembled yet distortable state as a unit without distortion of said strip severally, and a handle associated with said interconnections.

8. In combination, an ice tray for refrigerators, a removable grid positioned within said tray comprising contiguous longitudinal extending strips vertically disposed and supported along one edge upon the bottom of said tray, said strips being unconnected with each other throughout at least the greater portion of their extent and being of a configuration defining compartments within said tray, said strips being held in relative position by the walls of said tray and being relatively movable upon removal from the tray to release the ice formed within the compartments, interconnections for retaining said strips in an assembled yet distortable state as a unit without distortion of said strips severally, a handle associated with said interconnections, and means for loosening said grid in the tray upon movement of said handle.

9. In combination, an ice container for refrigerators, a removable grid located within said container comprising alternating rows of straight and reversely bent disjoined strips vertically disposed and supported upon the bottom of said container and relatively positioned by the side walls thereof, and means located at one end of said strips constituting a common interconnection therefor to retain the same in a loosely bundled state.

10. In combination, an ice tray for refrigerators having side and end walls, a removable grid located within said tray and defining compartments therein, a handle secured to said grid for removing the same from said tray, said handle being pivoted upon said grid and having portions spaced beyond the point of pivot in position to engage the top of said side walls upon opposite sides of said grid to exert a leverage against said tray to facilitate removal of said grid.

11. In combination, an ice tray for refrigerators having side and end walls, a removable grid located within said tray and defining compartments therein, a handle secured to said grid for removing the same from said tray, said handle being pivoted upon said grid and having portions extending beyond the point of pivot in position to engage the top of said side walls upon opposite sides of said grid to exert a leverage against said tray to facilitate removal of said grid upon an upward movement of said handle.

12. In combination, an ice tray for refrigerators, a removable grid located within said tray comprising a plurality of longitudinally extending strip members freely disposed relative to each other collectively defining compartments in said tray, means common to said strips and extending transversely thereof upon which the same are loosely received for removal from the tray as a unit, a handle portion connected at the ends of said means at opposite sides of said tray, and means associated with said handle and engageable with said tray at opposite sides of said grid to exert a leverage against said tray to facilitate separation between said tray and grid.

13. In combination, an ice tray for refrigerators, a removable grid comprising a plurality of separate strips, a handle portion having spaced vertical members, adjacent strips of said grid being hinged upon said vertical members, the upper portion of said handle extending over the end wall of said tray presenting an abutment, the location of said abutment with reference to said tray and grid being of a character permitting an implement to be inserted between said abutment and tray to effect a leverage facilitating removal of the tray from the grid.

14. In combination, an ice tray for refrigerators, a removable grid located in said tray, said grid comprising a plurality of separate longitudinal extending strips, a handle portion for said grid, the strips of said grid having connections with said handle of a character permitting relative movement between the strips without distortion of the strips themselves, a portion of said handle extending over the end of said tray and presenting an abutment, the location of said abutment with respect to said tray being of a character permitting an implement to be inserted between the abutment and end of the tray to effect a leverage facilitating removal of the grid from the tray.

15. In combination, an ice tray for refrigerators, a removable grid located in said tray, said grid comprising a plurality of separate disjoined strips, a handle portion for said grid, said strips being hinged upon a portion of said handle permitting relative movement between the strips without distortion of the strips themselves.

16. In combination, an ice tray for refrigerators having side and end walls, a removable grid located within said tray and defining compartments therein, and means pivoted to said grid for oscillatory movement in a plane parallel to said side walls, arranged to engage the tops of said side walls on opposite sides of said grid, intermediate said end walls to exert a leverage against said tops of the side walls for effecting a separation of said tray and said grid.

VICTOR N. HYBINETTE.